(12) United States Patent
Zhang et al.

(10) Patent No.: US 10,690,184 B2
(45) Date of Patent: Jun. 23, 2020

(54) AXIAL MAGNETIC BEARING HAVING A PROTECTIVE DEVICE

(71) Applicant: GREE GREEN REFRIGERATION TECHNOLOGY CENTER CO., LTD. OF ZHUHAI, Guangdong (CN)

(72) Inventors: Fang Zhang, Guangdong (CN); Yusheng Hu, Guangdong (CN); Xiaobo Zhang, Guangdong (CN); Jianning Liu, Guangdong (CN); Gao Gong, Guangdong (CN); Siyuan Tian, Guangdong (CN); Jinxin Jia, Guangdong (CN); Changguang Guo, Guangdong (CN); Guanghai Li, Guangdong (CN); Jiuzhan Su, Guangdong (CN); Chao Zhang, Guangdong (CN)

(73) Assignee: GREE GREEN REFRIGERATION TECHNOLOGY CENTER CO., LTD. OF ZHUHAI, Guangdong (CN)

( * ) Notice: Subject to any disclaimer, the term of this patent is extended or adjusted under 35 U.S.C. 154(b) by 0 days.

(21) Appl. No.: 16/076,800

(22) PCT Filed: Jan. 23, 2017

(86) PCT No.: PCT/CN2017/072200
§ 371 (c)(1),
(2) Date: Aug. 9, 2018

(87) PCT Pub. No.: WO2017/157107
PCT Pub. Date: Sep. 21, 2017

(65) Prior Publication Data
US 2019/0048930 A1 Feb. 14, 2019

(30) Foreign Application Priority Data

Mar. 16, 2016 (CN) .......................... 2016 1 0150713

(51) Int. Cl.
*F16C 32/04* (2006.01)
*H02K 7/10* (2006.01)
*H02K 7/09* (2006.01)

(52) U.S. Cl.
CPC ...... *F16C 32/0476* (2013.01); *F16C 2380/26* (2013.01); *H02K 7/09* (2013.01); *H02K 7/10* (2013.01)

(58) Field of Classification Search
CPC ........ H02K 7/09; H02K 7/10; F16C 32/0476; F16C 2380/26
(Continued)

(56) References Cited

U.S. PATENT DOCUMENTS 5,302,874 A * 4/1994 Pinkerton ............. F16C 32/044
310/90.5
5,317,226 A * 5/1994 New ................... F16C 32/0461
310/90.5

(Continued)

FOREIGN PATENT DOCUMENTS

CN 101132870 A 2/2008
CN 101771308 A 7/2010
(Continued)

OTHER PUBLICATIONS

International Search Report dated Apr. 28, 2017, in PCT/CN2017/072200 filed Jan. 23, 2017.
(Continued)

*Primary Examiner* — Alfonso Perez Borroto
*Assistant Examiner* — Rashad H Johnson
(74) *Attorney, Agent, or Firm* — Oblon, McClelland, Maier & Neustadt, L.L.P.

(57) ABSTRACT

An axial magnetic bearing includes a bearing body and a protective device. The bearing body includes a stator and a rotor. The protective device includes a first assembly fixedly (Continued)

mounted relative to the stator and a second assembly fixedly mounted relative to the rotor. One of the first assembly and the second assembly includes a first stopping portion, and the other of the first assembly and the second assembly includes a second stopping portion and a third stopping portion. A part of the first stopping portion is axially located between the second stopping portion and the third stopping portion. A protection gap of the protective device is smaller than a working gap of the bearing body.

14 Claims, 2 Drawing Sheets

(58) Field of Classification Search
USPC .......................................................... 310/90.5
See application file for complete search history.

(56) References Cited

U.S. PATENT DOCUMENTS

| | | | | |
|---|---|---|---|---|
| 5,553,948 | A | * | 9/1996 | Ito ............................ B23Q 1/38 384/100 |
| 6,121,704 | A | * | 9/2000 | Fukuyama .......... F16C 32/0459 310/90.5 |
| 2005/0275300 | A1 | | 12/2005 | El-Shafei |
| 2015/0354627 | A1 | * | 12/2015 | Bendaoud ........... F16C 32/0461 310/90.5 |
| 2016/0108967 | A1 | * | 4/2016 | Massini ................ F16C 37/005 310/90.5 |
| 2016/0298680 | A1 | * | 10/2016 | Huang .................... F16C 17/08 |

FOREIGN PATENT DOCUMENTS

| | | |
|---|---|---|
| CN | 202451603 U | 9/2012 |
| CN | 104454989 A | 3/2015 |
| CN | 204186531 U | 3/2015 |
| CN | 105299046 A | 2/2016 |
| CN | 105570300 A | 5/2016 |
| CN | 205401428 U | 7/2016 |
| DE | 2421853 A1 | 11/1975 |
| EP | 3 045 752 A1 | 7/2016 |
| JP | 9-196064 A | 7/1997 |

OTHER PUBLICATIONS

Combined Chinese Office Action and Search Report dated Aug. 1, 2017, in Patent Application No. 201610150713.5, citing documents AO-AS therein, 13 pages (with English translation and English Translation of Category of Cited Documents).

* cited by examiner

AXIAL MAGNETIC BEARING HAVING A PROTECTIVE DEVICE

The present application claims the priority of Chinese Application No. 201610150713.5, filed in the Chinese Patent Office on Mar. 16, 2016, and entitled "AXIAL MAGNETIC BEARING", the entire contents of which are herein incorporated by reference.

TECHNICAL FIELD

The present disclosure relates to the technical field of bearings, and more particularly to an axial magnetic bearing.

BACKGROUND

A magnetic bearing uses a magnetic force to levitate a rotor in the air relative to a stator so that there is no mechanical contact between the rotor and the stator. Compared with the traditional rolling bearings, sliding bearings and the like, the magnetic bearing has a rotor that can operate to a very high speed, and thus is often used in high-speed, ultra-high-speed applications, such as some high-speed, ultra-high-speed machines. In this kind of machines, the magnetic bearing is a very critical component, once a magnetic levitation system fails, a magnetic levitation product cannot start the levitation and cannot operate normally as a result, which often results in production losses. Therefore, a corresponding protective device needs to be configured when the magnetic bearing is designed.

Typically, the structure of an axial magnetic bearing with a protective device in the prior art is shown in FIG. 3. The axial magnetic bearing includes a front axial iron core 31, a front axial bearing control coil 32, a front axial protective bearing 33, a thrust disc 34, a back axial protective bearing 35, a back axial bearing control coil 36, a back axial iron core 37 and optical axis 38. The protection principle of the protective device of the axial magnetic bearing is mainly as follows: a spacing gap is formed between a right end face of the front axial protective bearing 33 and a left end face of the thrust disc 34 as well as between a right end face of the thrust disc 34 and a left end face of the back axial protective bearing 35, and the spacing gap is smaller than the working gap of the axial magnetic bearing (i.e., the gap between a right end face of the front axial iron core 31 and the left end face of the thrust disc 34, and the gap between a right end face of the thrust disc 34 and the back axial iron core 37). When the thrust disc 34 rotates to work, the left end face of the thrust disc 34 generates frictional contact with the right end face of the front axial protective bearing 33, and the right end face of the thrust disc 34 generates frictional contact with the left end face of the back axial protective bearing 35 so as to prevent ablation and damage to each of the axial iron cores due to friction with the thrust disc.

In the technical solution, the protection gap between each axial protective bearing and the thrust disc and the working gap between each axial iron core and the thrust disc depend entirely on the assembly accuracy and the processing accuracy and cannot be directly adjusted, so that the product qualification rate is difficult to control, the quality flexibility is poor, and the thrust disc needs to be dissembled and assembled for multiple times during indirect adjustment, in this way, the magnitude of interference of the thrust disc is reduced, and potential safety hazards are caused. Meanwhile, in the technical solution, the front axial protective bearing 33 is assembled with the front axial iron core 31 by an interference fit, and the back axial protective bearing 35 is assembled with the back axial iron core 37 by an interference fit, and after the axial protective bearings 33, 35 are worn, the whole axial magnetic bearing becomes useless and cannot be used again, thus bringing great losses and inconvenience to the product maintenance.

SUMMARY

In view of the above-mentioned situation of the prior art, the present disclosure provides an axial magnetic bearing that can protect a bearing body from being damaged when a magnetic levitation system loses stability.

According to one aspect of the present disclosure, there is provided an axial magnetic bearing, including:
a bearing body, including a stator and a rotor; and
a protective device, including:
a first assembly, fixedly mounted relative to the stator; and
a second assembly, fixedly mounted relative to the rotor,
wherein, one of the first assembly and the second assembly includes a first stopping portion, and the other of the first assembly and the second assembly includes a second stopping portion and a third stopping portion, a part of the first stopping portion is axially located between the second stopping portion and the third stopping portion, and a protection gap of the protective device is smaller than a working gap of the bearing body.

In some embodiments, the rotor includes a thrust disc, and the stator includes a first axial iron core, a second axial iron core, and a first coil and a second coil respectively arranged in the first axial iron core and the second axial iron core, wherein the thrust disc is positioned between the first axial iron core and the second axial iron core, and the working gap comprises first gaps existing between the thrust disc and the first axial core and between the thrust disc and the second axial core.

In some embodiments, the protection gap comprises second, gaps existing between the first stopping portion and the second stopping portion and between the first stopping portion and the third stopping portion.

In some embodiments, a axial spacer is arranged between the second stopping portion and the third stopping portion, or at least one of the second stopping portion and the third stopping portion includes an axial spacing portion located therebetween.

In some embodiments, the first stopping portion is a stator anti-collision ring arranged in the first assembly, and the second stopping portion and the third stopping portion are rotor anti-collision rings arranged in the second assembly; or the first stopping portion is a rotor anti-collision ring arranged in the second assembly, and the second stopping portion and the third stopping portion are stator anti-collision rings arranged in the first assembly.

In some embodiments, the second assembly further includes a first rotor collar, and the first rotor collar axially abuts against the rotor.

In some embodiments, the axial magnetic bearing further includes a second rotor collar, and the second rotor collar is axially arranged on the outer side of the second assembly.

In some embodiments, the axial magnetic bearing further includes a rotatable shaft, and the rotor and the second assembly are both sleeved on the rotatable shaft.

In some embodiments, the second assembly is in clearance fit with the rotatable shaft.

In some embodiments, the axial magnetic bearing further includes a stator assembly shell, and the first assembly is installed in the stator assembly shell.

In some embodiments, the first assembly is in clearance fit with the stator assembly shell.

In some embodiments, a gap adjustment member is arranged between the second stopping portion and the third stopping portion.

According to the embodiments of the present disclosure, the axial magnetic bearing is provided with the stopping portions that are fixed relative to the rotor and the stator respectively to form the protective device, the bearing body and the protective device can be separated, so that when the magnetic levitation system loses stability, the protective device is preferentially damaged instead of the complicated and precise axial magnetic bearing body so as to achieve, the purpose of protecting the axial magnetic bearing. Further, the protective device in some embodiments of the present disclosure can be assembled by gaps, thereby reducing the assembly difficulty and improving the production efficiency, meanwhile eliminating the shortcoming that the bearing rotor needs to be installed multiple times by a hot charging method during the assembly of the axial bearing in the prior art, and avoiding the problems of reduced magnitude of interference and the potential safety hazards. In addition, due to the axial magnetic bearing of some embodiments of the present disclosure, the protection gap of the protective device is easy to adjust, which is conducive to improving the assembly success rate.

BRIEF DESCRIPTION OF THE DRAWINGS

Hereinafter, preferred embodiments of an axial magnetic bearing according to the present disclosure will be described with reference to the drawings. In the drawings.

DETAILED DESCRIPTION

Figure 1:
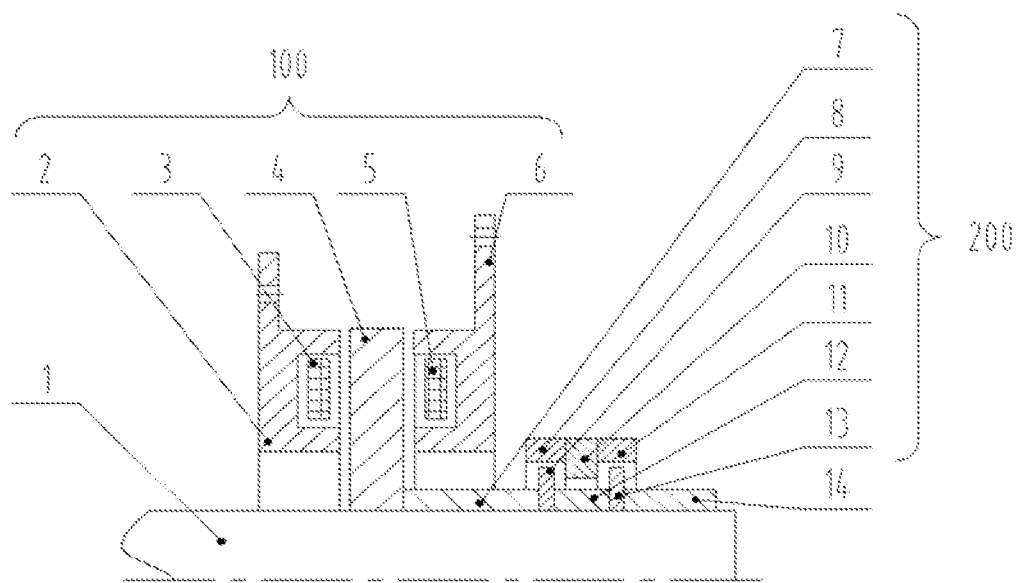
FIG. 1 is a structural schematic diagram of an axial magnetic bearing in some embodiments of the present disclosure.
Figure 2:
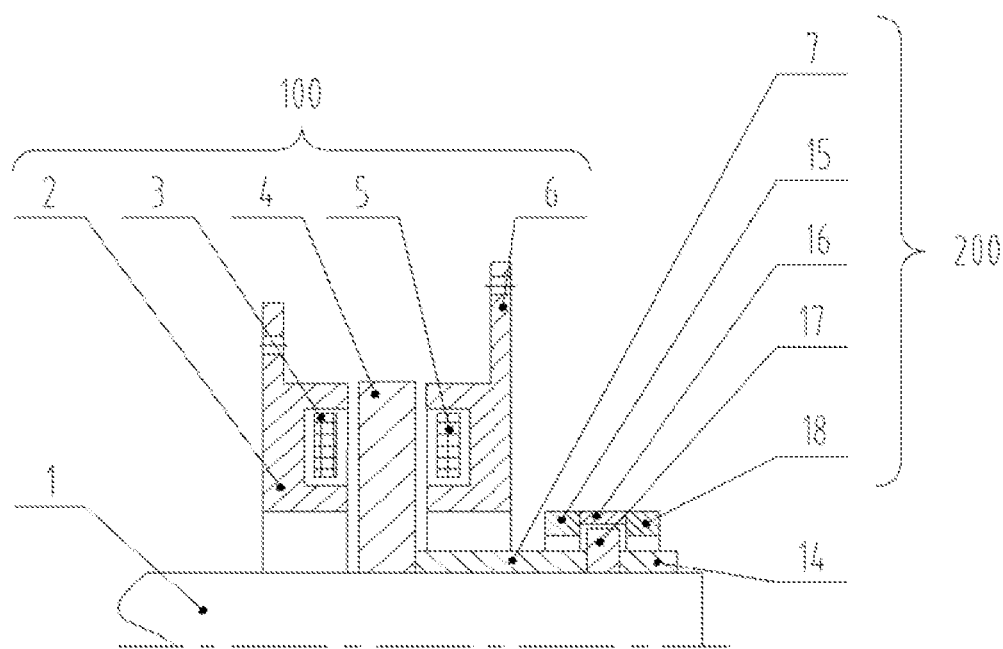
FIG. 2 is a structural schematic diagram of an axial magnetic bearing in some other embodiments of the present disclosure.

Referring to FIGS. 1 and 2, in view of the foregoing situations in the prior art, some embodiments of the present disclosure provide an axial magnetic bearing, including a bearing body 100 and a protective device 200. The bearing body 100 includes a stator and a rotor. The protective device 200 includes a first assembly fixedly mounted relative to the stator and a second assembly fixedly mounted relative to the rotor, one of the first assembly and the second assembly includes a first stopping portion (for example, the part represented by a reference numeral 10 in FIG. 1 or the part represented by a reference numeral 17 in FIG. 2), and the other of the first assembly and the second assembly includes a second stopping portion (for example, the part represented by a reference numeral 9 in FIG. 1 or the part represented by a reference numeral 15 in FIG. 2) and a third stopping portion (for example, the part represented by a reference numeral 13 in FIG. 1 or the part represented by a reference numeral 18 in FIG. 2), a part of the first stopping portion is axially located between the second stopping portion and the third stopping portion, and a protection gap of the protective device is smaller than a working gap of the bearing body.

Since the first stopping portion can make a relative movement in the axial direction only in the space between the second stopping portion and the third stopping portion, the rotor and the stator of the bearing body can only make relative movement with completely the same movement range as the first stopping portion, so that the contact between the rotor and the stator of the bearing body can be prevented through these stopping portions, thereby protecting the bearing body and solving the problem of direct damage to the bearing body during operation. For example, using FIG. 1 as an example, in the operation of the axial magnetic bearing, when the rotor generates axial displacement relative to the stator, the second stopping portion and the third stopping portion synchronously move relative to the first stopping portion, and before contacting between the rotor and the stator, the first stopping portion comes into contact with the second stopping portion or the third stopping portion and generates friction so as to avoid frictional wear of the rotor and the stator of the bearing body.

In particular, in the present disclosure, the protective device 200 can be arranged on one side of the bearing body 100 (for example, the right side as shown in the figure, and can also be the left side of the drawing) so as to be separated from the bearing body 100, so that the protective device is preferentially damaged and the bearing body is not damaged in the case of damage, thus adding safety protection to the magnetic bearing and providing product reliability. In addition, as the protective device is separated from the bearing body, the assembly process and the adjustment process are easy to implement.

In some embodiments, as shown in the figures, the rotor includes a thrust disc 4, and the stator includes a first axial iron core 2, a second axial iron core 6, and a first coil 3 and a second coil 5 respectively arranged in the first axial iron core 2 and the second axial iron core 6, wherein the first axial iron core 2 and the second axial iron core 6 are arranged on both sides of the thrust disc 4 and both have a first gap with the side faces (i.e., the among the three components) of the thrust disc 4, namely, the working gap of the bearing, in order to provide a necessary magnetic pull force for the working of the axial bearing. When each coil is powered on, the magnetic pull force generated by each coil causes levitation between the stator and the rotor.

In some embodiments, the protection gap of the protective device comprises second gaps existing between the first stopping portion and the second stopping portion and between the first stopping portion and the third stopping portion. The second gap is optionally smaller than the first gap. By setting and adjusting the second gap, the protection threshold of the protective device can be conveniently set. For example, when a smaller second gap is used, in the case of friction among the stopping portions of the protective device, there is a greater safety margin between the stator and the rotor, so that no damage is generated to the bearing body, even if the shutdown maintenance is delayed.

In some embodiments, a axial spacer (e.g., the part represented by a reference numeral 12 in FIG. 1 or the part represented by a reference numeral 16 in FIG. 2) is arranged between the second stopping portion and the third stopping portion. A reliable and stable spacing between the second stopping portion and the third stopping portion can be guaranteed by the axial spacer so as to guarantee the second gap.

Alternatively, at least one of the second stopping portion and the third stopping portion includes an axial spacing portion located therebetween. That is, the part represented by the reference numeral 12 in FIG. 1 or the part represented by the reference numeral 16 in FIG. 2 can alternatively be a part of the stopping portions on the two sides, for example, the part represented by the reference numeral 12 in FIG. 1 can form an integral whole with the stopping portion on the left side, or forms an integral whole with the stopping portion on the right side, or is divided into two parts and form an integral whole with the stopping portions on the two sides respectively so as to achieve an axial spacing effect to guarantee the second gap.

In some embodiments, the stopping portions are annular parts.

For example, as shown in FIG. 1, the first stopping portion is a stator anti-collision ring 10 arranged in the first assembly, and the second stopping portion and the third stopping portion are rotor anti-collision rings 9 and 13 arranged in the second assembly. Rotor collars 8 and 11 are optionally arranged on the two sides of the first stopping portion for axially spacing and fixing the stator anti-collision ring 10, the inside diameters of the rotor collars 8 and 11 are greater than the inside diameter of the stator anti-collision ring 10 and are greater than the outside diameters of the rotor anti-collision rings 9 and 13. The axial spacer 12 between the second stopping portion and the third stopping portion is also optionally an annular part, for example, a third rotor collar.

Or as shown in FIG. 2, the first stopping portion is a rotor anti-collision ring 17 arranged in the second assembly, and the second stopping portion and the third stopping portion are stator anti-collision rings 15 and 18 arranged in the first assembly. The axial spacer 16 between the second stopping portion and the third stopping portion is a stator collar for instance, and the inside diameter thereof is greater than the inside diameters of the stator anti-collision rings 15 and 18 and is greater than the outside diameter of the rotor anti-collision ring 17.

In some embodiments, as shown in FIGS. 1 and 2, the second assembly further includes a first rotor collar 7, and the first rotor collar 7 axially abuts against the rotor. For example, the first rotor collar 7 is arranged between the rotor (the thrust disc 4) and the first stopping portion (the rotor anti-collision ring 17 in the solution as shown in FIG. 2) or the second stopping portion (the rotor anti-collision ring 9 in the solution as shown in FIG. 1). By means of the first rotor collar 7, the position of the corresponding rotor anti-collision ring relative to the thrust disc 4 can be conveniently determined to guarantee the uniformity of the second gap between the rotor anti-collision ring and the stator anti-collision ring.

In some embodiments, the axial magnetic bearing further includes a second rotor collar 14, and the second rotor collar 14 is axially arranged on the outer side of the second assembly, that is, the second rotor collar and the rotor are respectively located on opposite sides of the second assembly. For example, the second rotor collar 14 is arranged on the outer side of the first stopping portion (the rotor anti-collision ring 17 in the solution as shown in FIG. 2) or the third stopping portion (the rotor anti-collision ring 13 in the solution as shown in FIG. 1). The second assembly can be locked axially through the second rotor collar 14. For example, the second rotor collar 14 can further include connecting threads, for example, the second assembly is screwed on a corresponding rotatable shaft through the threads.

In some embodiments, as shown in FIGS. 1 and 2, the axial magnetic bearing further includes a rotatable shaft 1 (for example, an plain axis), and the rotor and the second assembly are both sleeved on the rotatable shaft 1. For example, the thrust disc 4 is assembled on the rotatable shaft by interference fit. When the thrust disc 4 is assembled on the rotatable shaft by interference fit, the second assembly can be fixed to the rotatable shaft 1 via the second rotor collar 14 or other fastening device on the outer side so as to achieve the fixation relative to the rotor.

Figure 3:
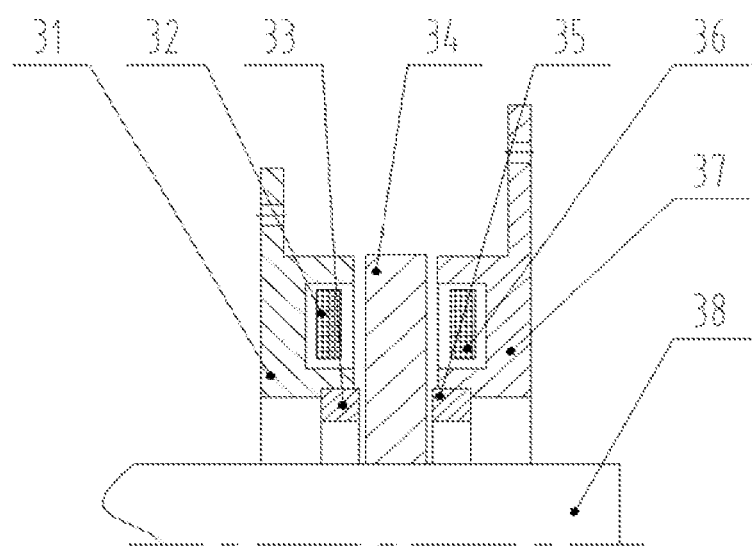
FIG. 3 is a structural schematic diagram of an axial magnetic bearing in the prior art.

In some embodiments, the second assembly is in clearance fit with the rotatable shaft 1. This setting greatly simplifies the assembly process and no longer need a heating interference fit during the assembly of the structure in the prior art structure as shown in FIG. 3, in this way, the operation is simple, and no redundant heating equipment is required.

In some embodiments, the axial magnetic bearing of the present disclosure further includes a stator assembly shell (not shown, for example, the stator of the bearing body is assembled therein), and the first assembly is installed in the stator assembly shell. Since both of the stator and the first assembly are installed in the stator assembly shell, the fixation of the first assembly relative to the stator can be achieved.

In some embodiments, the first assembly is in clearance fit with the stator assembly shell. This setting also greatly simplifies the assembly process and no longer needs a heating interference fit during the assembly of the structure in the prior art structure as shown in FIG. 3, in this way, the operation is simple, and no redundant heating equipment is required.

By adoption of the clearance fit setting, the second gap between the stopping portions can be conveniently adjusted in addition to simplifying the assembly of the first assembly and the second assembly.

In some embodiments, a gap adjustment member is arranged between the second stopping portion and the third stopping portion. The axial spacers 12, 16 or the axial spacing portions replacing the same firstly determine the minimum spacing between the second stopping portion and the third stopping portion, and when the minimum spacing does not meet the need of the second gap, the additional gap adjustment member can be sleeved between the second stopping portion and the third stopping portion to increase the spacing between the second stopping portion and the third stopping portion. For example, the gap adjustment member may include a series of adjustment washers with different thicknesses.

In the optional solution of FIG. 1, the first assembly includes the stator collars 8 and 11 and the stator anti-collision ring 10, all of which are stator assembly members and are in clearance fit with the stator assembly shell and are assembled in an axial locking manner. The second assembly includes the first rotor collar 7, the rotor anti-collision rings 9 and 13 and the axial spacer 12, all of which are rotor assembly members and are in clearance fit with the rotatable shaft 1 and are in connecting and locking fit with the threads of the rotatable shaft 1 through the second rotor collar 14. The clearance fit is adopted in the whole assembly process, and no heating interference fit is needed, so that the operation is simple, and no redundant heating equipment is required. In addition, the adjustment of the second gap is facilitated, the assembly flexibility is improved, and the product qualification ratio is improved.

In the optional solution of FIG. 2, the first assembly includes the stator anti-collision rings 15 and 18 and the axial spacer 16; and the second assembly includes the first rotor collar 7 and the rotor anti-collision ring 17. Compared with the optional solution of FIG. 1, the present optional solution has the same principle, but the first stopping portion is exchanged with the second stopping portion and the third stopping portion, so that the two parts are omitted, and the assembly difficulty and the production cost are further reduced.

In summary, the axial magnetic bearing of the present disclosure has the protective device that is completely different from that in the prior art, the magnetic bearing can be separated from the protective device, so that the protective device is preferentially damaged in the case of damage, thus adding safety protection to the magnetic bearing and providing product reliability. Meanwhile, compared with the prior art, the technical solution of the present disclosure has the advantages that the protection gap of the protective device can be adjusted, the dependency on the assembly accuracy and the processing accuracy is reduced, the clearance fit is adopted in all assembly, no heating interference assembly is needed, the assembly difficulty can be reduced, the assembly time is shortened, and the production efficiency is improved.

It is easily understood by those skilled in the art that the aforementioned measures can be freely combined and superposed without conflict.

It should be understood that the above embodiments are only exemplary and not restrictive, and those skilled in the art can make various obvious or equivalent modifications or replacements to the above details without departing from the basic principles of the present disclosure, and these modifications or replacements are encompassed within the scope of the claims of the present disclosure.

The invention claimed is:

1. An axial magnetic bearing, comprising:
   a bearing body, comprising a stator and a rotor; and
   a protective device, comprising:
      a first assembly, fixedly mounted relative to the stator; and
      a second assembly, fixedly mounted relative to the rotor,
      wherein, one of the first assembly and the second assembly comprises a first stopping portion, and the other of the first assembly and the second assembly comprises a second stopping portion and a third stopping portion, a part of the first stopping portion is axially located between the second stopping portion and the third stopping portion, and a protection gap of the protective device is smaller than a working gap of the bearing body, and
      wherein the working gap comprises an axial gap between the stator and the rotor and the protection gap comprises an axial gap between the first assembly and the second assembly.

2. The axial magnetic bearing according to claim 1, wherein the rotor comprises a thrust disc, and the stator comprises a first axial iron core, a second axial iron core, and a first coil and a second coil respectively arranged in the first axial iron core and the second axial iron core, wherein the thrust disc is positioned between the first axial iron core and the second axial iron core, and the working gap comprises first gaps existing between the thrust disc and the first axial core and between the thrust disc and the second axial core.

3. The axial magnetic bearing according to claim 1, wherein the protection gap comprises second gaps existing between the first stopping portion and the second stopping portion and between the first stopping portion and the third stopping portion.

4. The axial magnetic bearing according to claim 1, wherein an axial spacer is arranged between the second stopping portion and the third stopping portion, or at least one of the second stopping portion and the third stopping portion comprises an axial spacing portion located therebetween.

5. The axial magnetic bearing according to claim 1, wherein the first stopping portion is a stator anti-collision ring arranged in the first assembly, and the second stopping portion and the third stopping portion are rotor anti-collision rings arranged in the second assembly; or the first stopping portion is a rotor anti-collision ring arranged in the second assembly, and the second stopping portion and the third stopping portion are stator anti-collision rings arranged in the first assembly.

6. The axial magnetic bearing according to claim 1, wherein the second assembly further comprises a first rotor collar, and the first rotor collar axially abuts against the rotor.

7. The axial magnetic bearing according to claim 1, further comprising a second rotor collar, wherein the second rotor collar is axially arranged on the outer side of the second assembly.

8. The axial magnetic bearing according to claim 1, further comprising a rotatable shaft, wherein the rotor and the second assembly are both sleeved on the rotatable shaft.

9. The axial magnetic bearing according to claim 8, wherein the second assembly is in clearance fit with the rotatable shaft.

10. The axial magnetic bearing according to claim 1, further comprising a stator assembly shell, and the first assembly is installed in the stator assembly shell.

11. The axial magnetic bearing according to claim 10, wherein the first assembly is in clearance fit with the stator assembly shell.

12. The axial magnetic bearing according to claim 1, wherein a gap adjustment member is arranged between the second stopping portion and the third stopping portion.

13. The axial magnetic bearing according to claim 1, further comprising rotor collars arranged on two sides of the first stopping portion to axially space the first stopping portion, wherein inside diameters of the rotor collars are greater than an inside diameter of the first stopping portion.

14. The axial magnetic bearing according to claim 13, wherein the inside diameters of the rotor collars are greater than outside diameters of the first stopping portion the second stopping portion and the third stopping portion.

* * * * *